(No Model.)

B. B. & J. H. WRIGHT.
MACHINE FOR CLEANING FRUIT.

No. 600,394. Patented Mar. 8, 1898.

WITNESSES:

INVENTORS
B. B. Wright
J. H. Wright
BY
ATTORNEYS

UNITED STATES PATENT OFFICE.

BENJAMIN B. WRIGHT AND JAMES HARRISON WRIGHT, OF RIVERSIDE, CALIFORNIA.

MACHINE FOR CLEANING FRUIT.

SPECIFICATION forming part of Letters Patent No. 600,394, dated March 8, 1898.

Application filed August 20, 1897. Serial No. 648,928. (No model.)

*To all whom it may concern:*

Be it known that we, BENJAMIN B. WRIGHT and JAMES HARRISON WRIGHT, of Riverside, in the county of Riverside and State of California, have invented a new and Improved Machine for Cleaning Fruit, of which the following is a full, clear, and exact description.

The object of the invention is to provide a machine especially adapted for washing or cleaning fruit, being especially adapted for washing oranges and lemons.

A further object of the invention is to construct a machine of the character above set forth which will thoroughly clean the rind of such fruit as lemons and oranges without injuring such fruit in the slightest degree, the fruit to be cleaned being fed into the machine at one end and delivered at the opposite end in a thoroughly-cleansed condition.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
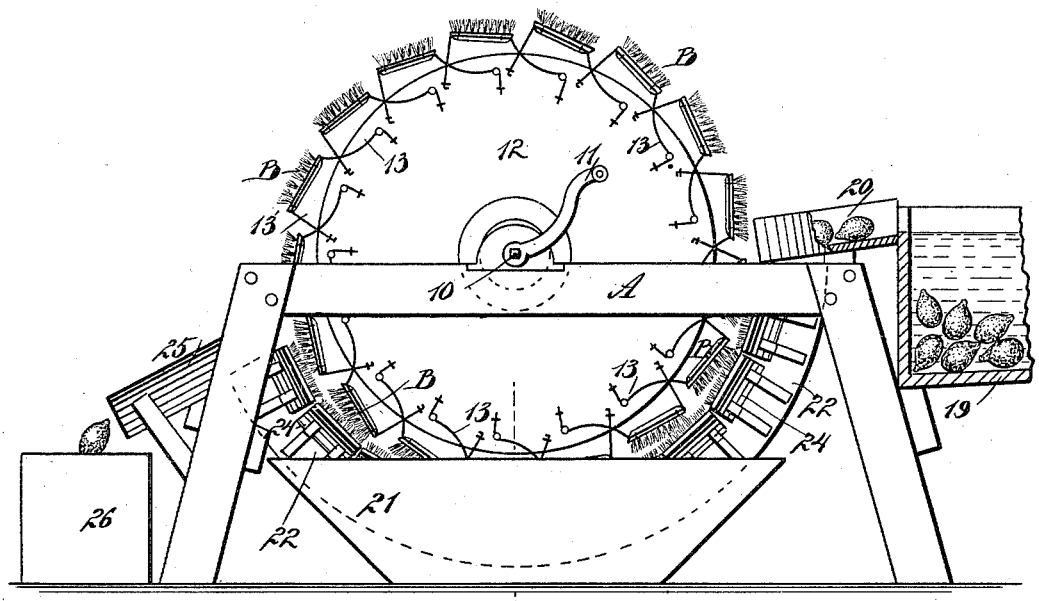
Figure 2:
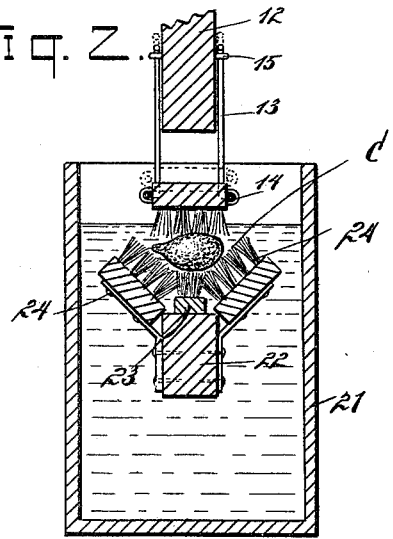
Figure 3:
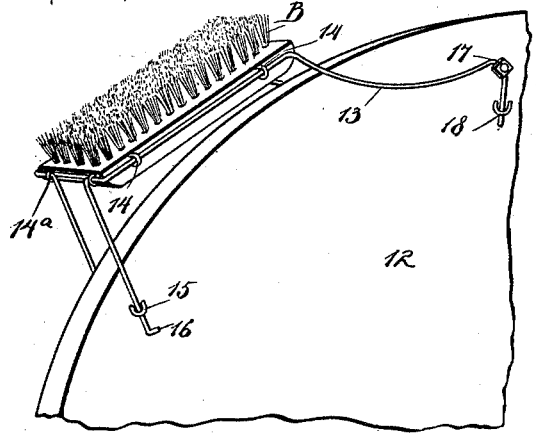

Figure 1 is a side elevation of the machine, parts being in section. Fig. 2 is a vertical section through the rinsing-tank and a portion of the cleaning-wheel; and Fig. 3 is a perspective view of a portion of the cleaning-wheel, illustrating the application of a brush to the same.

A frame A is provided which usually consists of horizontal bars and legs supporting said bars, and upon the horizontal bars of the frame a shaft 10 is journaled, provided with a crank-handle 11 for turning the same, or the shaft may be revolved through other means.

A wheel 12 is securely attached to the shaft 10, and the periphery of the wheel is provided with variable brushes B. The brushes are supported in any suitable or approved manner beyond the periphery of the wheel, the supporting devices for the brushes being such that the said brushes may have movement to and from the said periphery. In the drawings the brushes are shown as supported by spring rods or bars 13, which are passed through guide-staples 14 or their equivalents, secured at each side of the head of a brush, and through similar staples 14ª at one end, the spring-rods after leaving the staples 14ª being carried one at each side of the periphery of the wheel through staples or keepers 15, secured to the side faces of the wheel a suitable distance from the periphery, and the lower end of each spring-rod passed through the keepers 15 terminates in a head 16, which may be in the nature of a crank, as shown in Fig. 3. The opposite ends of the spring-rods after leaving the staples 14 are curved and carried at each side of the wheel 12 and are clamped to the said wheel by bolts and nuts 17, as also shown in Fig. 3, the spring-rods being furthermore carried from the bolts or clamping devices through staples or keepers 18. We desire it, however, to be understood that other means may be employed for securing the spring rods or bars to the wheel 12, and that the spring-rods serve as hinges connecting the brushes to the wheel.

At one end of the frame a water-trough 19 is supported in any suitable or approved manner, in which the fruit to be cleaned is placed, so that the water in the trough may loosen any foreign matter adhering to the fruit. A feed-trough 20 is placed adjacent to one end of the water-trough 19, and the feed-trough is so placed that the fruit placed therein may be readily fed to the brushes of the wheel 12. The wheel 12 is made to revolve in a rinsing-tank 21, and a segmental bar 22 is secured to the end portions of the frame, extending down into the rinsing-tank. This bar 22 is provided with brushes 23, secured upon its upper face, and with brushes 24 at each side, preferably meeting the central brushes, the side brushes being at different inclinations, forming a runway or cleaning-trough C. At the end of the frame opposite that at which the fruit is fed to the machine a delivery-spout 25 is secured, and a receptacle 26 is so located as to receive the cleaned fruit from the delivery-spout, as shown in Fig. 1.

In operation the fruit having been soaked in the trough 19 is placed in the feed-trough and is delivered into the space between the cleaning trough or runway C and the variable brushes at the periphery of the cleaning-wheel. The fruit will be carried by the wheel along the cleaning trough or runway, the brushes of the trough or runway C and the brushes on the wheel both acting on the fruit and thoroughly cleansing the same, and the fruit will be rinsed in the tank 21 and delivered to the spout 25 in a thoroughly-cleansed condition.

The machine is exceedingly simple, it is durable, and it is economic and may be operated by hand or by power, and the brushes on the cleansing-wheel may be hinged thereto or may be spring-mounted or mounted in any way to render them variable.

Having thus described our invention, we claim as new and desire to secure by Letters Patent—

1. In a machine for cleaning or washing fruit, the combination with a rinsing-tank, and a cleaning trough-shaped runway, a portion of which enters the rinsing-tank, the said runway having a brush-surface, of a wheel mounted to revolve in proximity to the brush-surface of the cleaning-runway, hinges attached to the wheel, and brushes carried by said hinges beyond the periphery of the wheel, for the purpose set forth.

2. In a machine for cleaning or washing fruit, the combination, with a rinsing-tank, and a segmental trough-shaped runway, a portion whereof enters the rinsing-tank, the said runway having a brush-surface, of a cleaning-wheel mounted to revolve in close proximity to the brush-surface of the cleaning-runway, and brushes located at the periphery of the wheel, and arranged to have movement to and from the periphery of said wheel, as and for the purpose specified.

3. In a machine for cleaning or washing fruit, the combination, with a frame, a rinsing-tank and a segmental trough-shaped runway entering the rinsing-tank and having its upper surface formed of a brush material, of a wheel mounted to revolve in the frame in proximity to the cleaning-runway, springs attached to the wheel, and extending beyond its periphery, and brushes carried by said springs, as and for the purpose specified.

4. In a machine for cleaning or washing fruit, the combination with a wheel, of springs having one end rigidly secured to the wheel and their other ends slidably connected thereto, said springs projecting beyond the periphery of the wheel and brushes secured to the projecting portions of said springs, substantially as described.

5. In a machine for cleaning or washing fruit, a wheel, consisting of a disk, spring-rods arranged in pairs and each having one end fixedly secured to the sides of the disk and its other end working in a guide on the disk, said spring projecting beyond the periphery of the disk, and brushes secured to the projecting portions of the springs, substantially as described.

BENJAMIN B. WRIGHT.
JAMES HARRISON WRIGHT.

Witnesses:
  THOS. BAKEWELL, Jr.,
  WALTER L. KOETHEN.